(No Model.)
N. M. JONES & R. TALBOT.
METHOD OF PREPARING WOOD CHIPS FOR MAKING PULP.
No. 573,981. Patented Dec. 29, 1896.
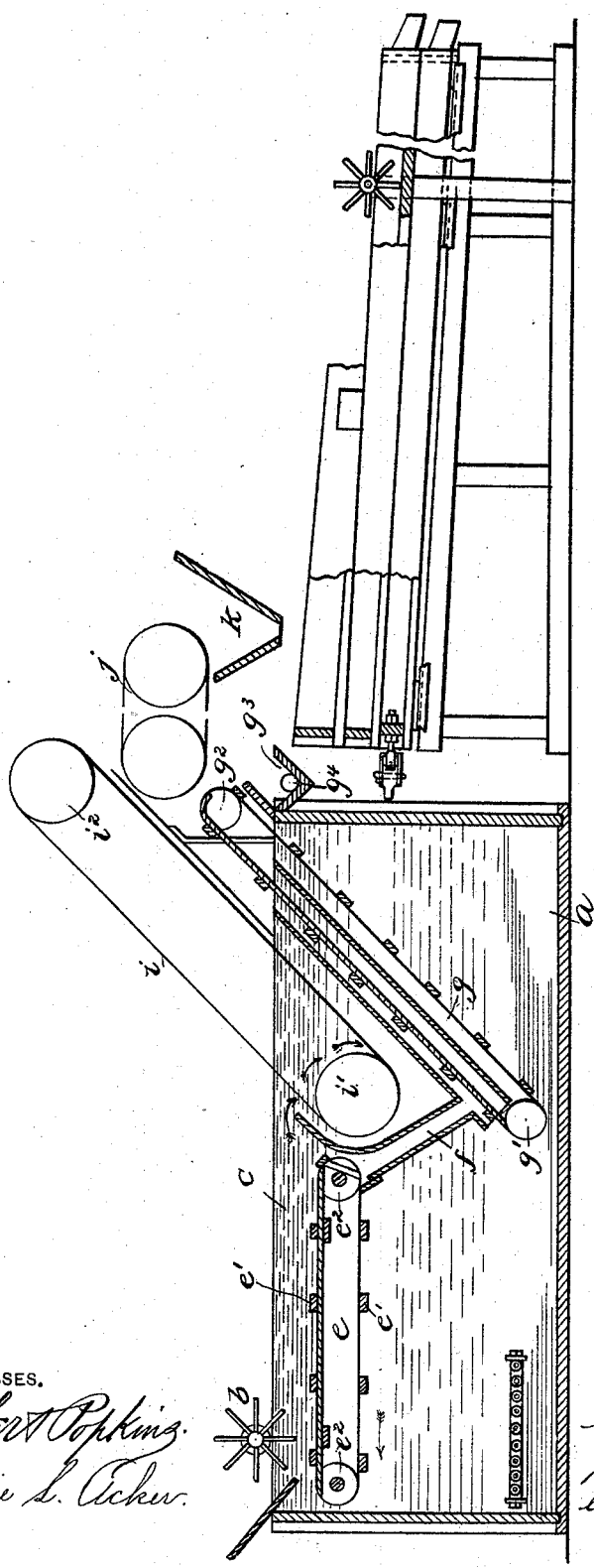
WITNESSES.
INVENTORS

UNITED STATES PATENT OFFICE.

NATHANIEL M. JONES AND REGINALD TALBOT, OF LINCOLN, MAINE; SAID TALBOT ASSIGNOR TO CHARLES W. COFFIN, OF BANGOR, MAINE.

METHOD OF PREPARING WOOD CHIPS FOR MAKING PULP.

SPECIFICATION forming part of Letters Patent No. 573,981, dated December 29, 1896.

Application filed November 2, 1895. Serial No. 567,749. (No specimens.)

*To all whom it may concern:*

Be it known that we, NATHANIEL M. JONES and REGINALD TALBOT, of Lincoln, in the county of Penobscot and State of Maine, have invented new and useful Improvements in Methods of Preparing Wood Chips for Making Pulp; and we do hereby declare the following to be a full, clear, and exact description of said invention, reference being had to the accompanying drawings, and to the letters of reference marked thereon, which form a part of this specification.

This invention relates to the preparation of chips used in the manufacture of wood-pulp; and it has for its object the rapid and complete moistening of the perfect or selected chips preparatory to the cooking in a digester, so they may the more rapidly absorb the acid and steam, and simultaneously therewith the convenient and ready separation of the selected chips from the dirt and other objectionable matter.

Heretofore it has been common to subject the chips to the action of steam at low pressure to moisten them; but this practice has been found to possess some objectionable features, one being that the process is a slow one, another that the action of the steam is not readily controllable owing to the necessarily low pressure employed, and another that the chips are necessarily in a more or less compact mass, so that some portions of the chips do not receive the proper moisture from the steam.

This invention, in one of its steps, utilizes one of the agencies of nature for the practical purpose of quickly and equally moistening wood chips, owing to the fact that the clear-wood chips when submerged in liquid, such as water, will rise to the top thereof. This immersion of the chips and their subsequent passage through the water, owing to the difference in the specific gravities of the wood and water, results in the chips becoming separated from each other to such extent that all portions of their surfaces will become quickly and uniformly moistened, the water also penetrating the pores of the wood completely, owing to the chips being in practice of small size. This latter action, however, occurs only in connection with the clear-wood chips, while those made wholly or principally from the knots and knotty portions contain so much resinous matter that they not only do not absorb water, but they also fail to rise to the top of the liquid with the clear-wood chips, and they therefore become separated from the latter. They are, in fact, of such relative specific gravity that they fall to the bottom of a body of water together with the dirt and other relatively heavy objectionable matter, and thus become separated from the clear-wood chips, the latter rising to the top of the body of liquid, from which they may be removed by hand or by some suitable form of apparatus, in a thoroughly moistened condition, ready for "cooking" in the digester.

The accompanying drawing, in which we have illustrated one form of apparatus by means of which the method may be carried out, represents a longitudinal section of the apparatus.

*a* represents a tank, and *b* represents a rotary agitator or striker which extends across the upper portion of the tank and is preferably composed of a shaft and a series of independent arms radiating therefrom, the arms being thickly arranged, so that when the agitator is rapidly rotated they will strike practically all points along a line extending across the surface of a body of liquid *c* contained in said tank, the liquid extending to such height that the downwardly-projecting arms of the agitator enter the liquid.

The agitator is so arranged that it subdivides the surface of the liquid into a chip-receiving area and a chip-delivering area. The chips are deposited in a mass in the chip-receiving area and are attacked by the agitator and forcibly scattered and submerged, the agitator moving in the direction indicated by the arrow marked thereon. The agitator therefore moves the liquid at and near the surface of the body *c* in such a direction as to cause it to carry the chips into the chip-delivering area and cause them to encounter the chip-elevator, hereinafter described. The knot-wood chips and other heavy matter, all of which will hereinafter be termed "waste," have a tendency to sink in the liquid, this tendency being increased by the moistening caused by the forcing of the chips into the liquid by the agitator.

$e$ represents a waste-conveyer upon which the descending waste is deposited, said conveyer being preferably an endless band provided with slats $e'$ and supported by rolls or sprocket-wheels $e^2$ $e^2$, to which motion is imparted in any suitable way.

The conveyer $e$ extends under the chip receiving and delivering areas and delivers the waste through an inclined spout or chute $f$ to a waste-elevator $g$, which is an endless band running upon rolls or wheels $g'$ $g^2$ and arranged at a suitable angle, so that it is adapted to raise the waste from the tank and drop it into a waste-conveyer $g^3$ at one end of the tank, said conveyer having a screw $g^4$ or other means for progressively removing the waste that is deposited in it.

$i$ represents a chip-elevator composed of an endless band, preferably of wire-cloth, supported by rollers or wheels $i'$ $i^2$ and arranged at an incline, the lower portion of said chip-elevator being at one end of the chip-delivering area of the body of liquid, so that it receives the chips from said area and elevates them, finally discharging them upon a conveyer $j$, by which they may be removed to a hopper $k$, which may be arranged over a shaker adapted to separate the free liquid from the chips.

We are aware that it is old to subject wood to the soaking action of water previous to the grinding and chipping, and that it is also old to mechanically remove the bark, knots, or other deleterious parts of the wood previous to the chipping. We are also aware that it has been proposed to separate material of different specific gravities by causing some of the material to float along the surface of a body of liquid and some to sink therein, but our invention differs therefrom, as set forth in the claim at the end of this specification.

In the carrying out of our method it is essential that every particle of the material, whether clear-wood chips or knots of any size, shall be carried below the surface of the liquid to insure the complete and proper moistening and the sorting of the chips.

We claim—

The improved method of simultaneously moistening and sorting the clear-wood chips from a mass of chips for cooking in a digester, the process consisting in positively and completely submerging the mass in a liquid of greater specific gravity than the clear-wood chips; then permitting the clear-wood chips individually to scatter and rise through the liquid to the surface thereof, and allowing the knotty chips and other refuse of the mass to remain at the bottom, substantially as described.

In testimony whereof we affix our signatures in presence of two subscribing witnesses.

NATHANIEL M. JONES.
REGINALD TALBOT.

Witnesses:
CHAS. D. BLANCHARD,
FRANK R. LINTON.